No. 615,031. Patented Nov. 29, 1898.
E. R. MALMBORG.
POSTMARKING AND CANCELING MACHINE.
(Application filed July 31, 1897.)
(No Model.) 17 Sheets—Sheet 1.
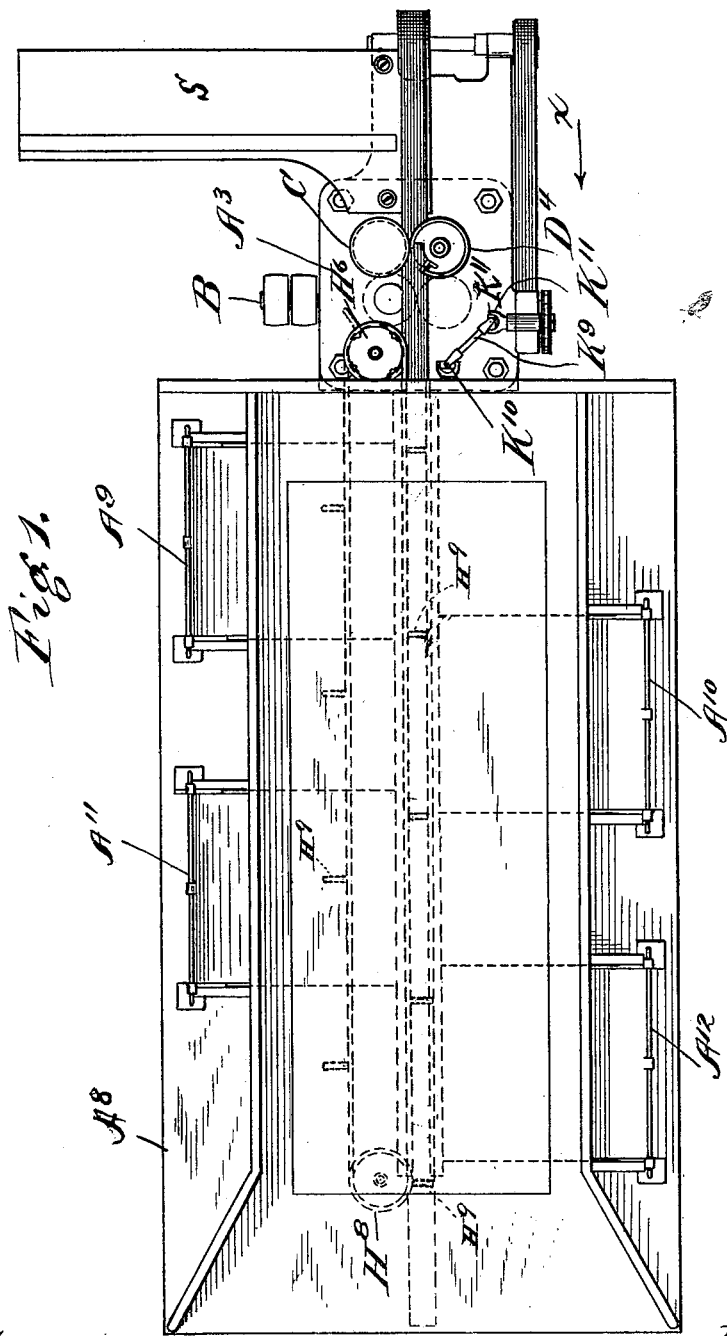

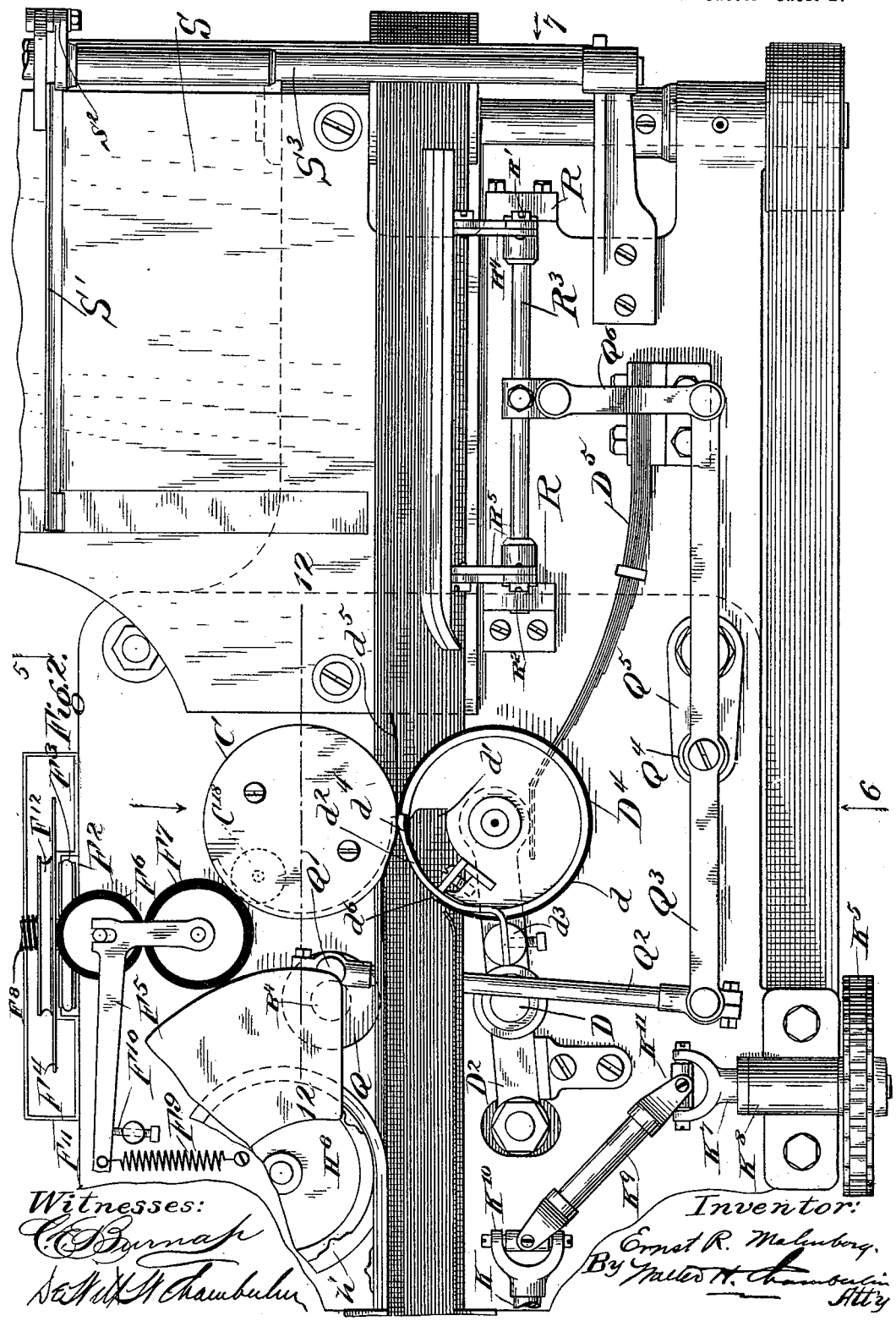

No. 615,031. Patented Nov. 29, 1898.
E. R. MALMBORG.
POSTMARKING AND CANCELING MACHINE.
(Application filed July 31, 1897.)
(No Model.) 17 Sheets—Sheet 3.
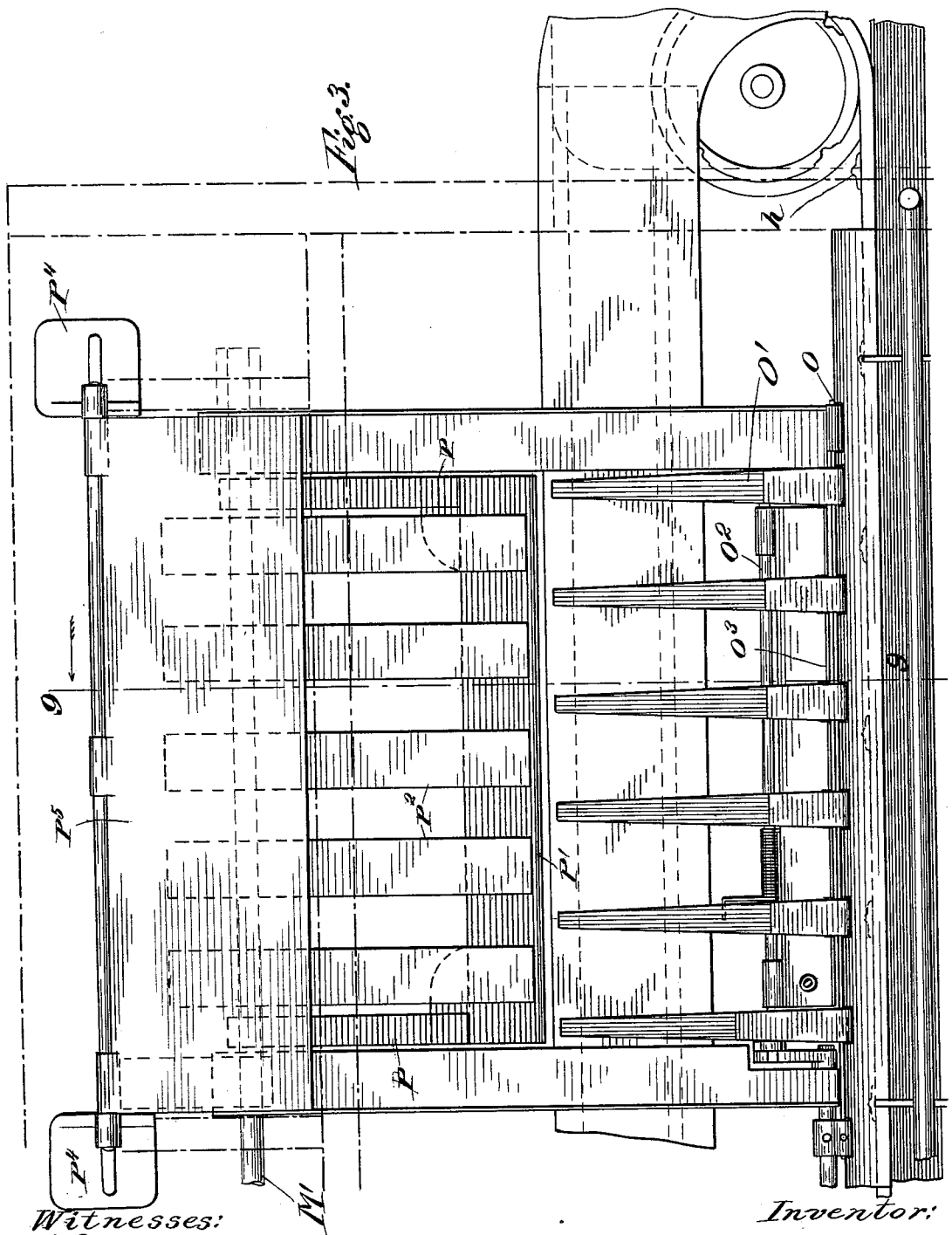

No. 615,031. Patented Nov. 29, 1898.
E. R. MALMBORG.
POSTMARKING AND CANCELING MACHINE.
(Application filed July 31, 1897.)
(No Model.) 17 Sheets—Sheet 4.
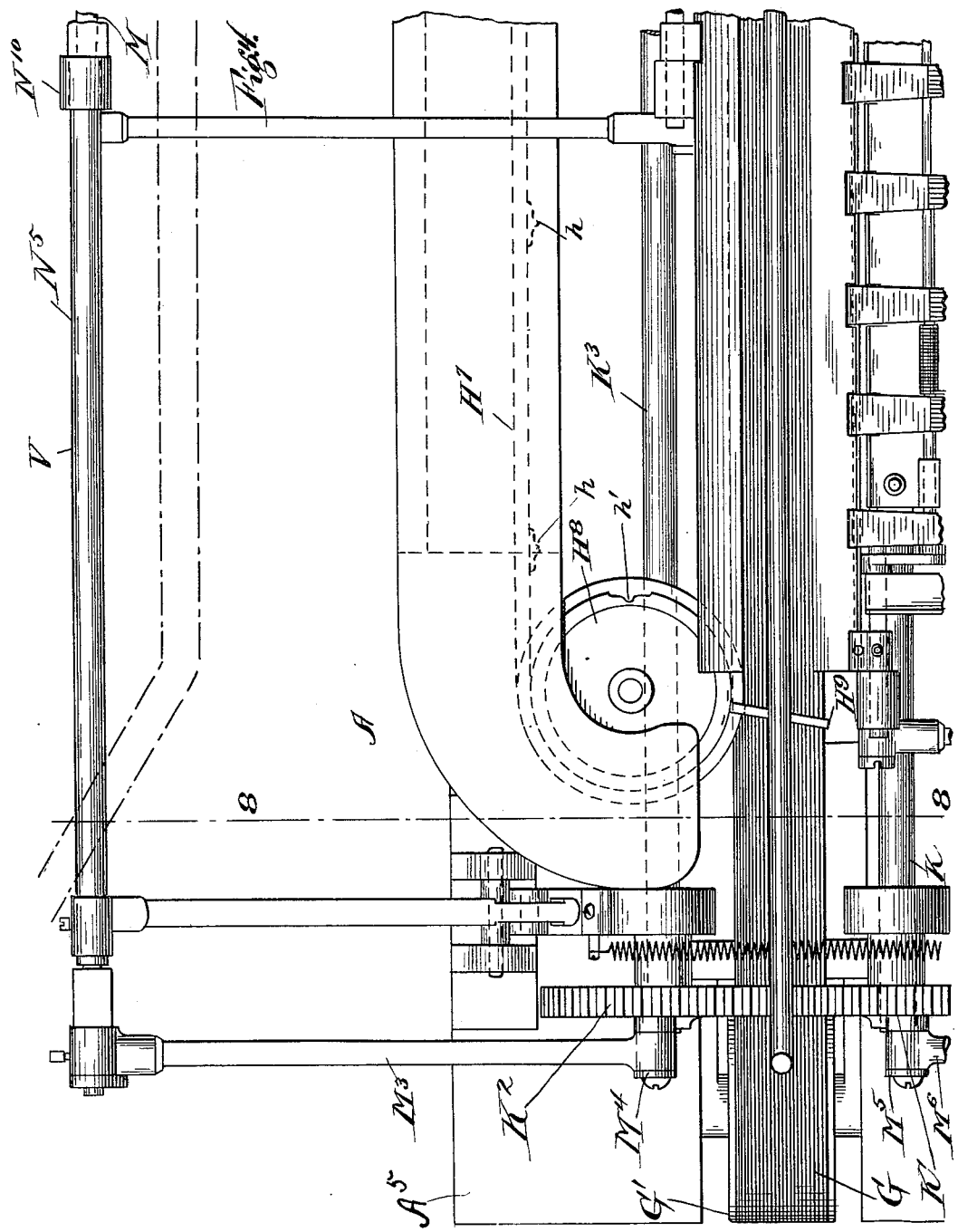
Witnesses:
Inventor:
Ernst R. Malmborg,
By Walter H. Chamberlin
Atty

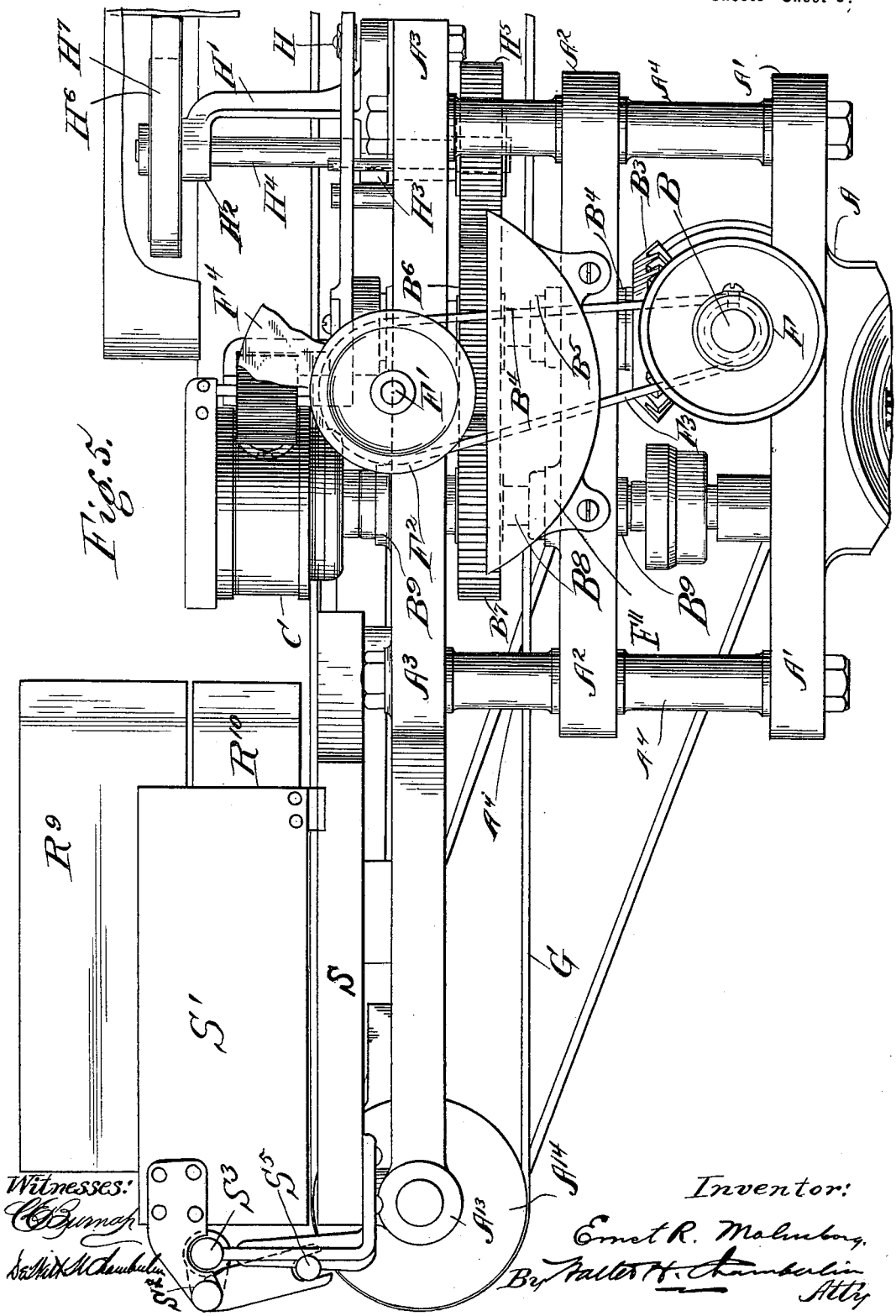

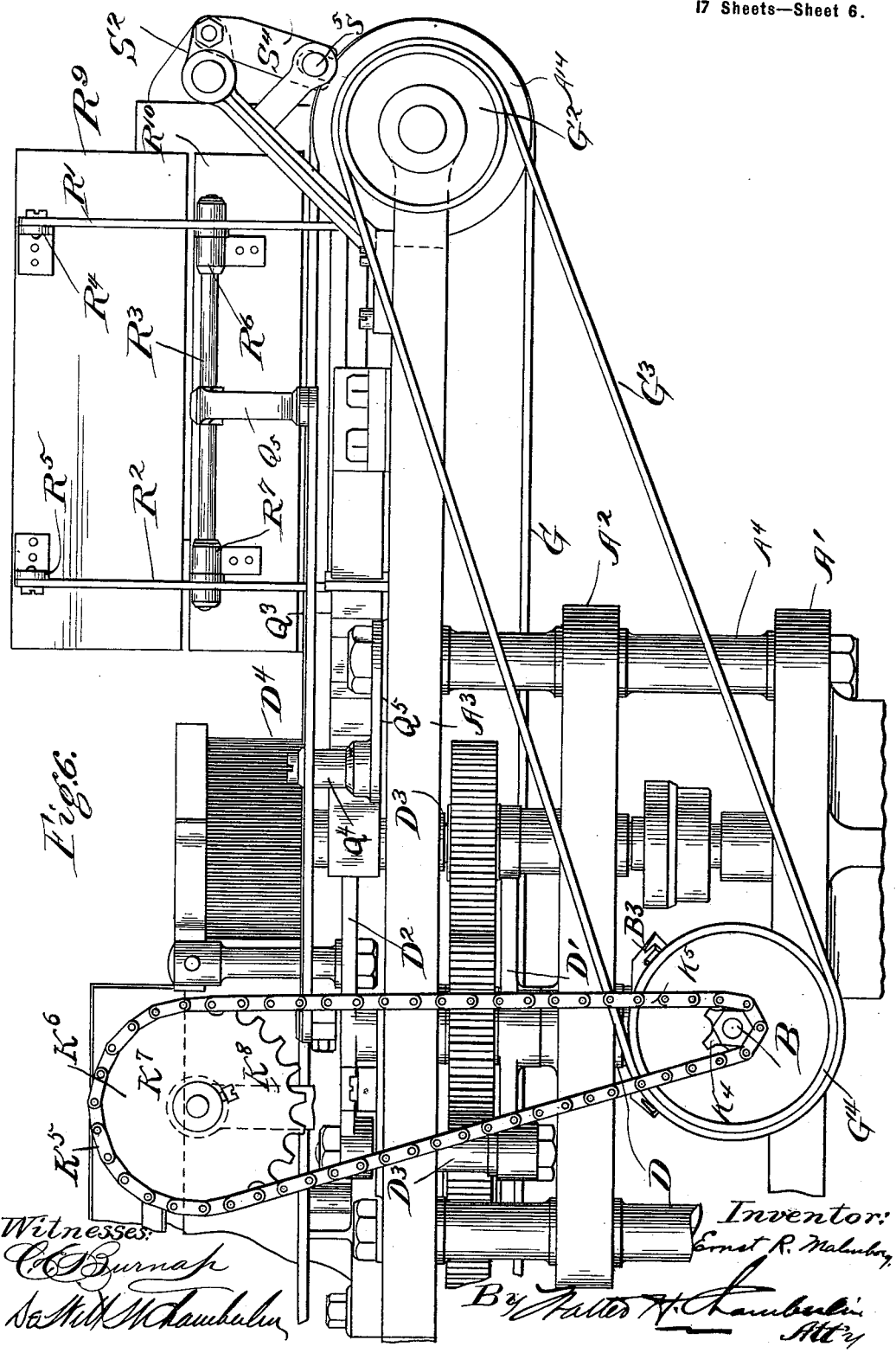

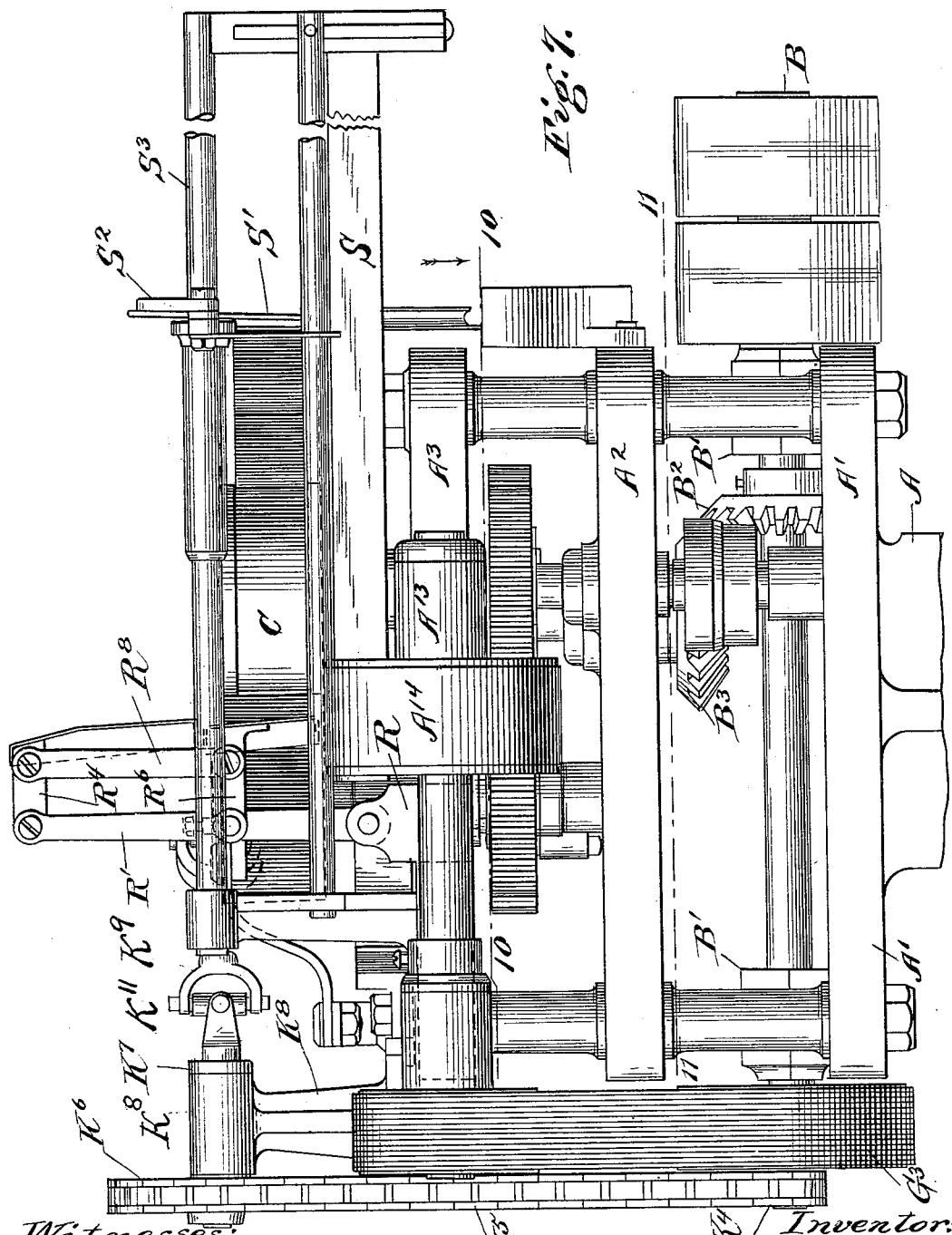

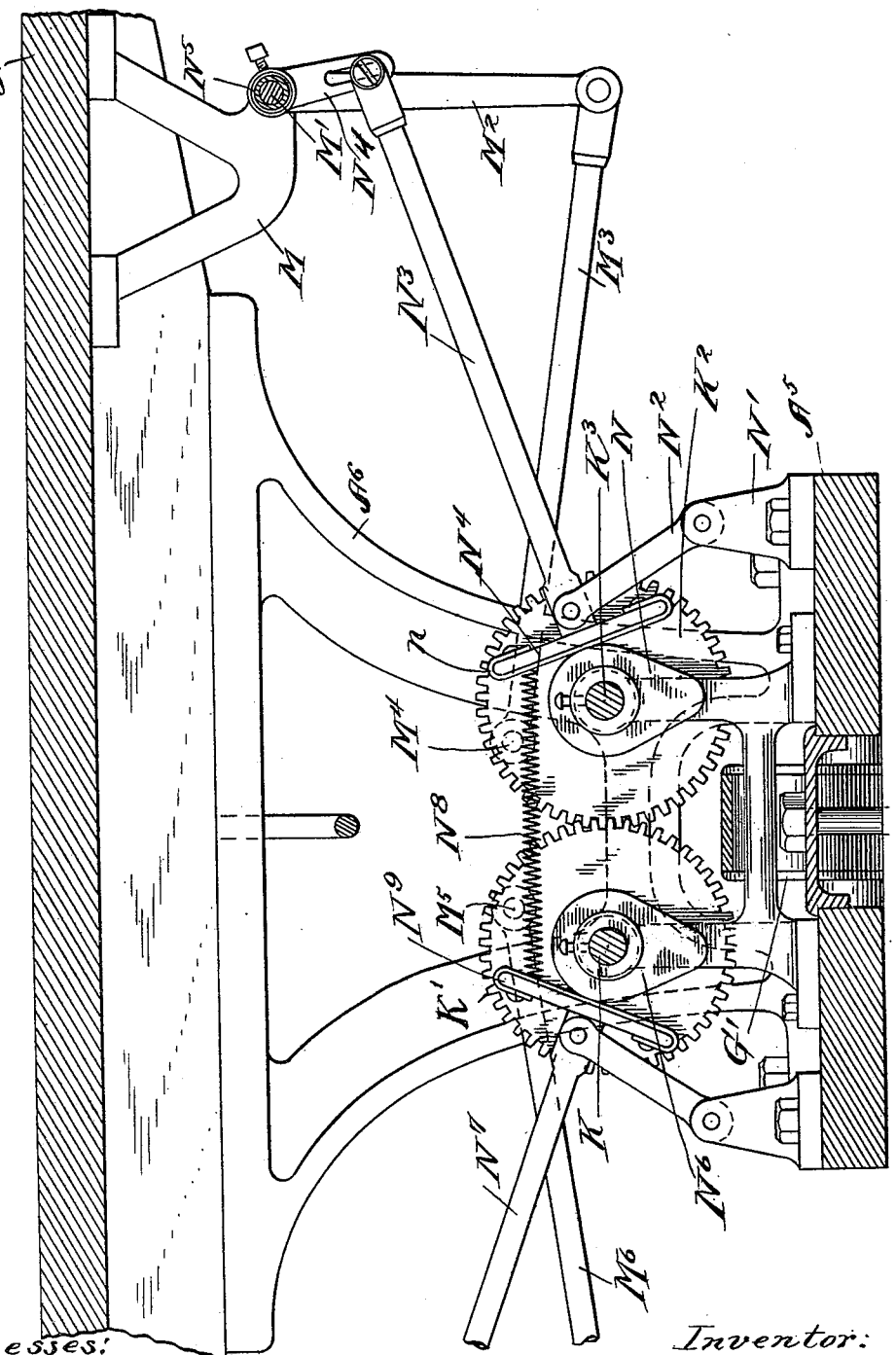

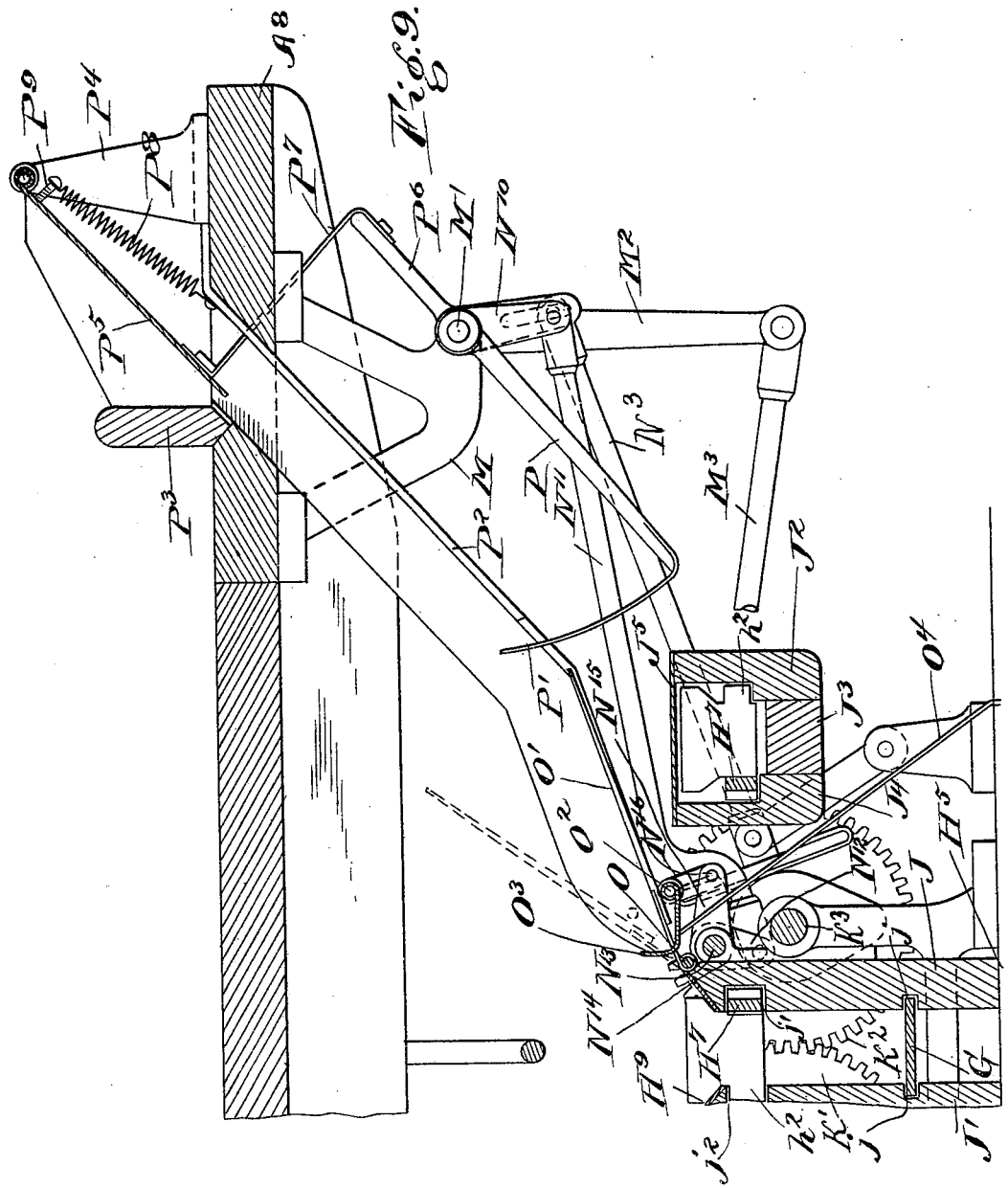

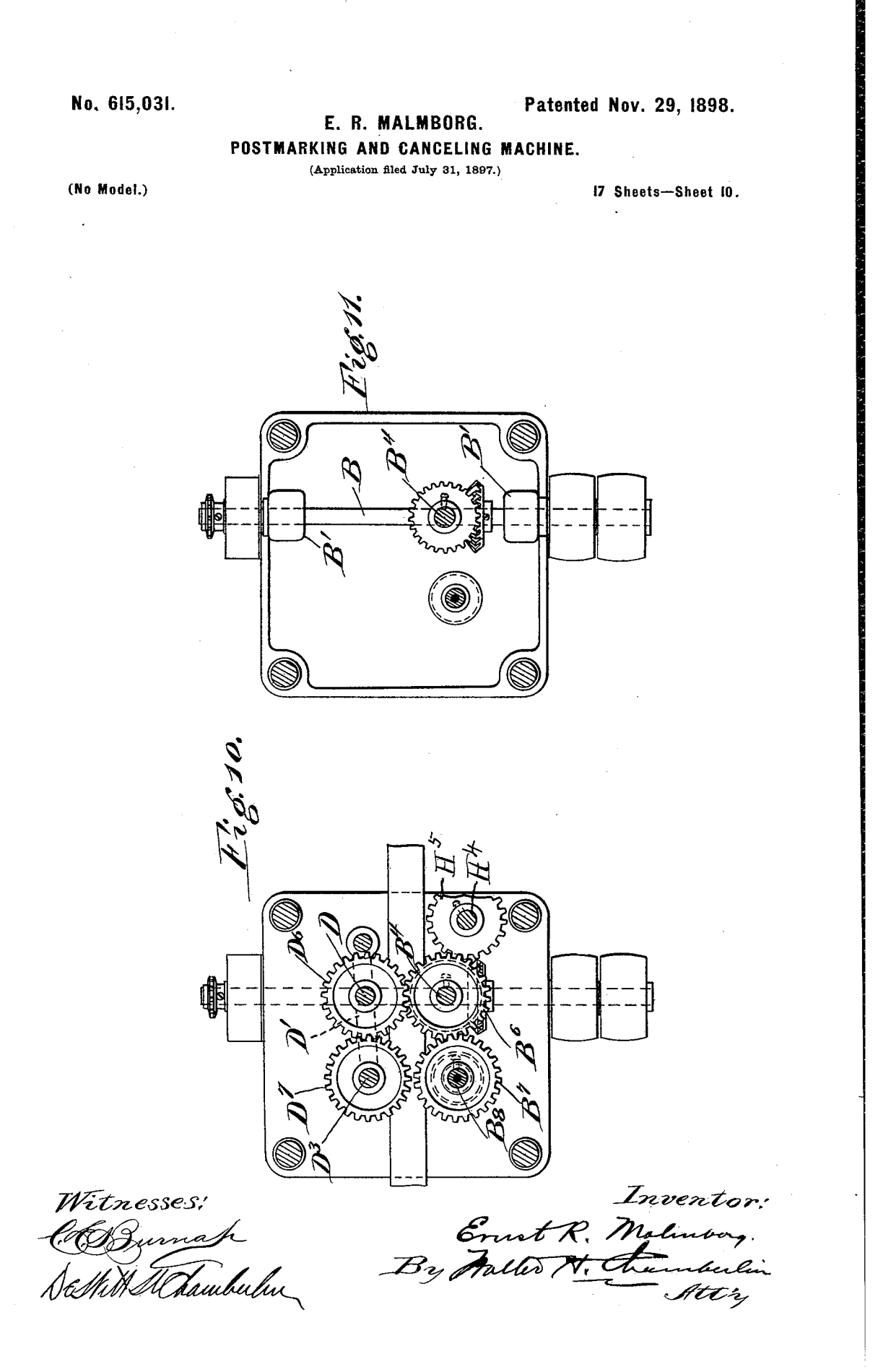

No. 615,031. Patented Nov. 29, 1898.
E. R. MALMBORG.
POSTMARKING AND CANCELING MACHINE.
(Application filed July 31, 1897.)

(No Model.) 17 Sheets—Sheet 10.

Fig. 11.

Fig. 10.

Witnesses: Inventor:
Ernst R. Malmborg.
By Walter H. Chamberlin
Att'y

THE NORRIS PETERS CO., PHOTO-LITHO., WASHINGTON, D. C.

No. 615,031. Patented Nov. 29, 1898.
E. R. MALMBORG.
POSTMARKING AND CANCELING MACHINE.
(Application filed July 31, 1897.)
(No Model.) 17 Sheets—Sheet 11.
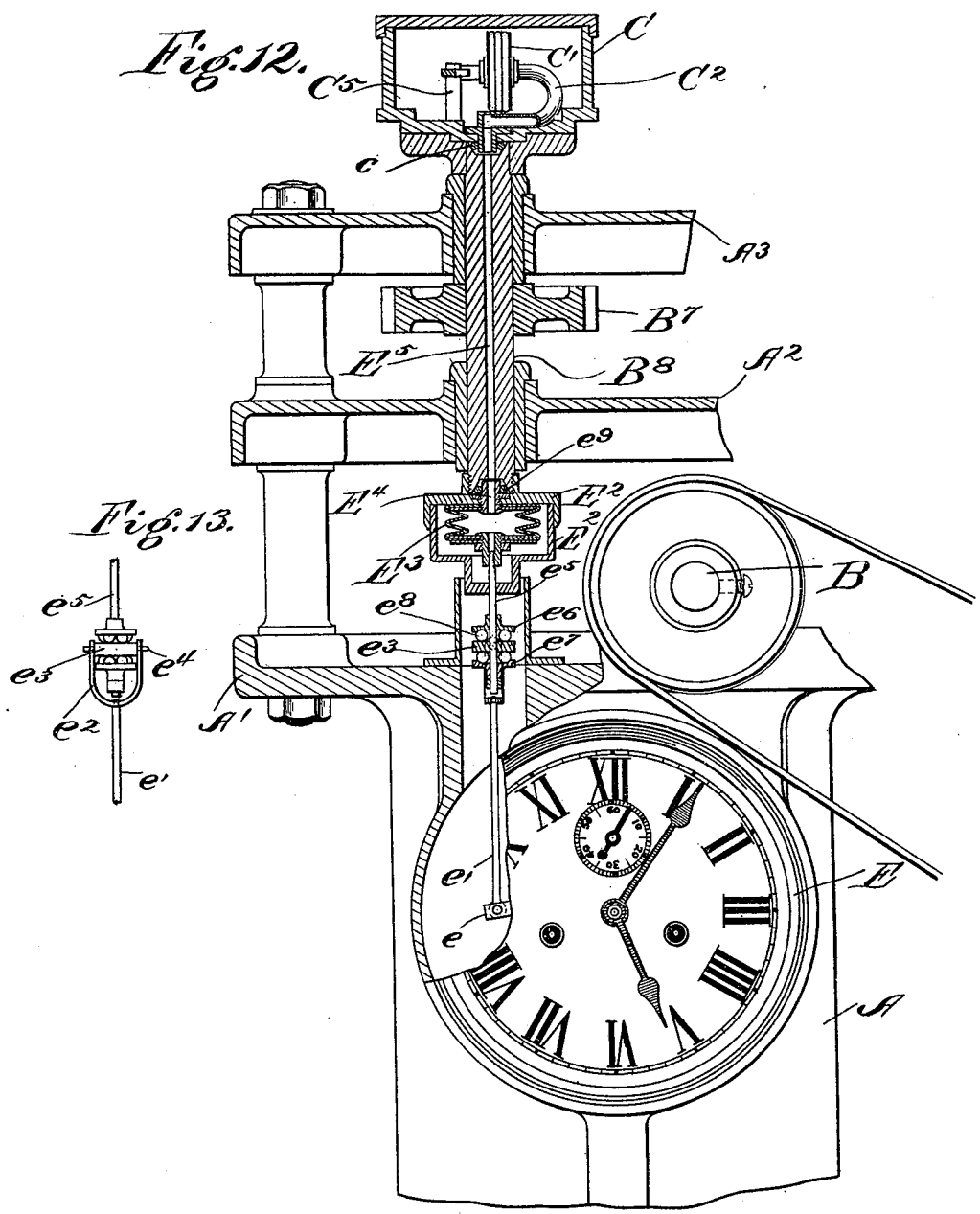

No. 615,031. Patented Nov. 29, 1898.
E. R. MALMBORG.
POSTMARKING AND CANCELING MACHINE.
(Application filed July 31, 1897.)
(No Model.) 17 Sheets—Sheet 12.
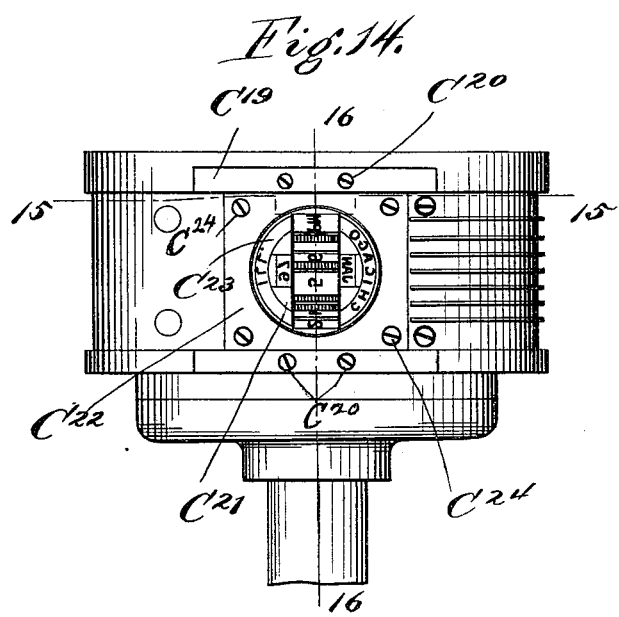
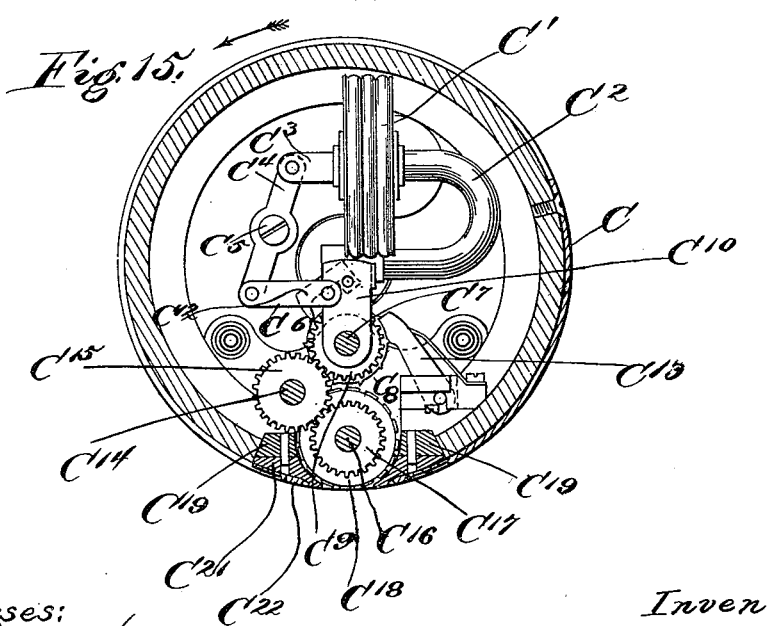

No. 615,031. Patented Nov. 29, 1898.
E. R. MALMBORG.
POSTMARKING AND CANCELING MACHINE.
(Application filed July 31, 1897.)
(No Model.) 17 Sheets—Sheet 13.
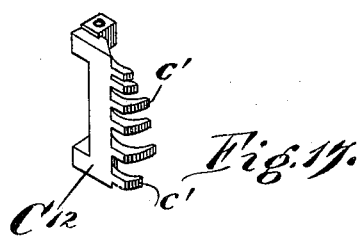
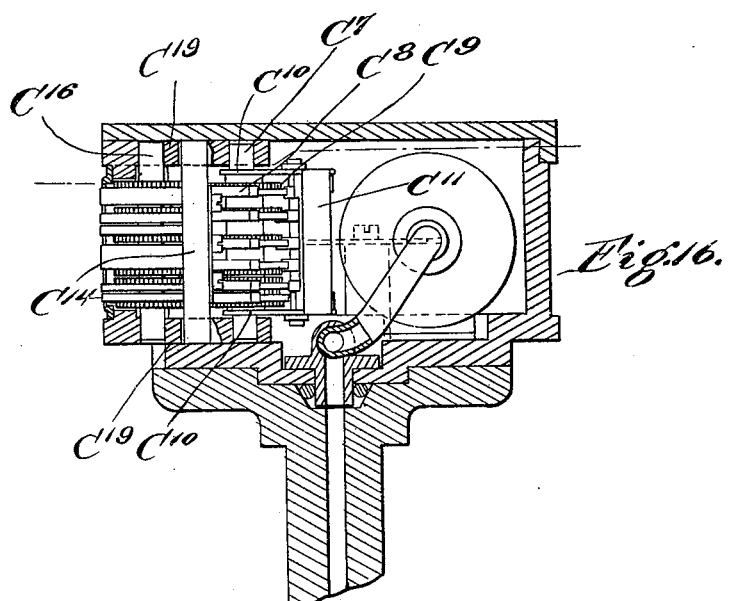
Witnesses: Inventor: Ernst R. Malmborg No. 615,031. Patented Nov. 29, 1898.
E. R. MALMBORG.
POSTMARKING AND CANCELING MACHINE.
(Application filed July 31, 1897.)
(No Model.) 17 Sheets—Sheet 14.
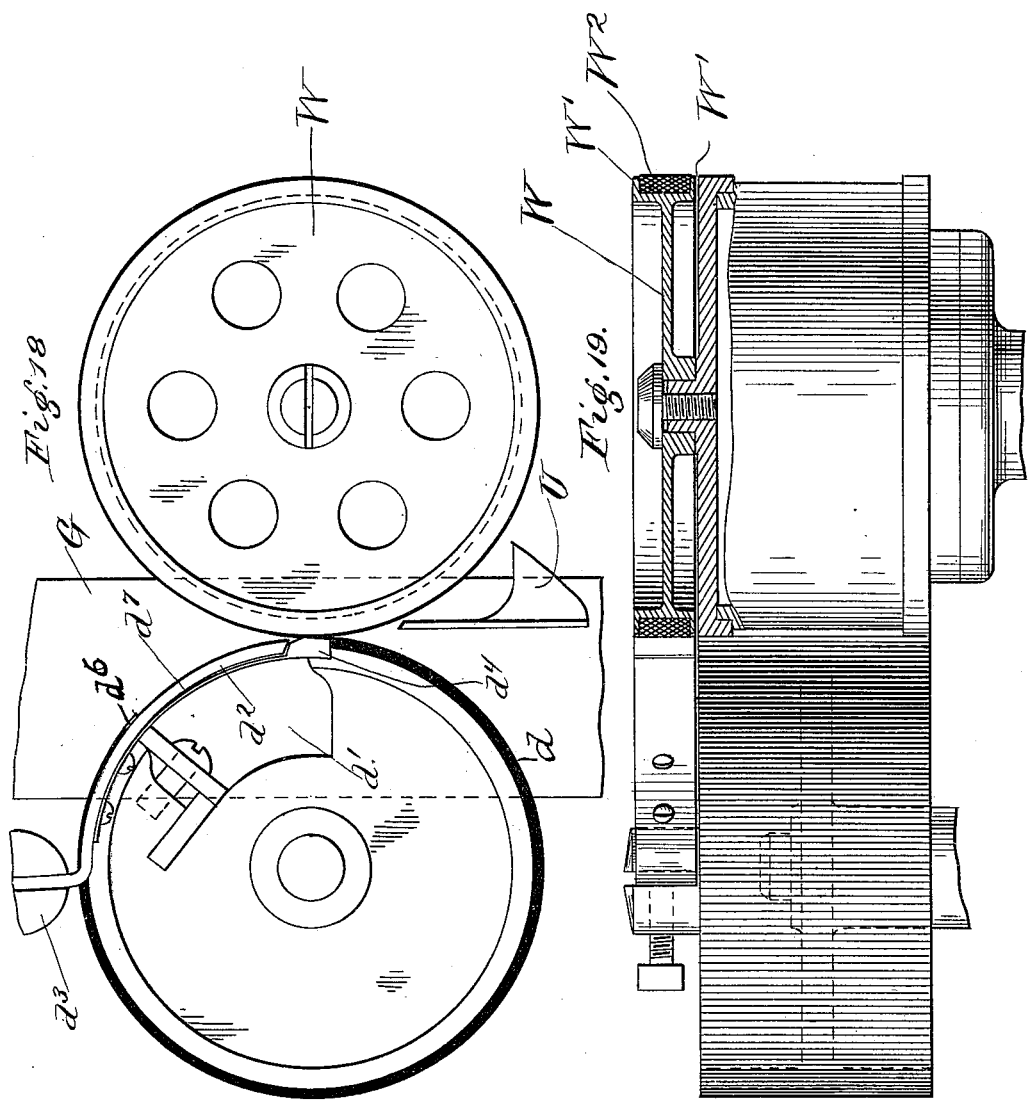

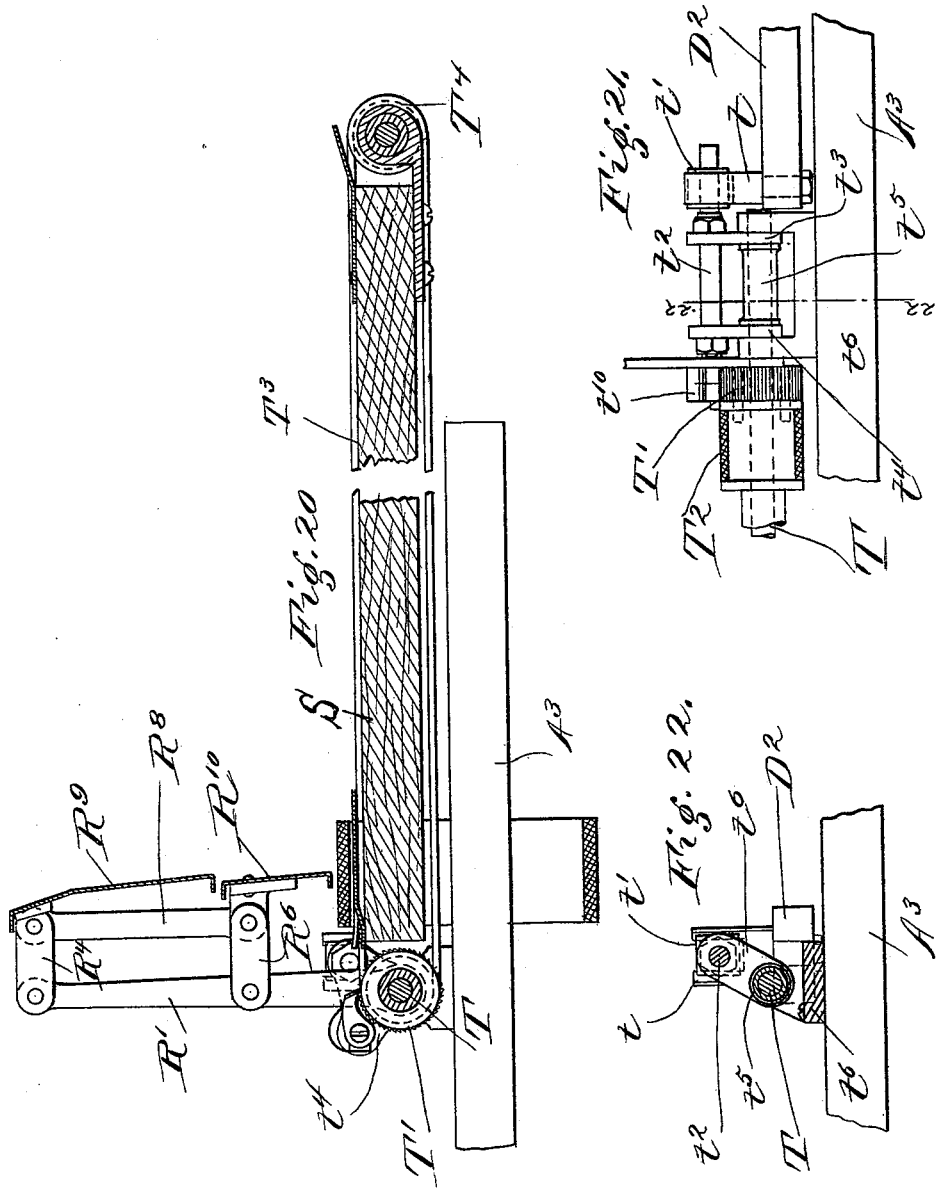

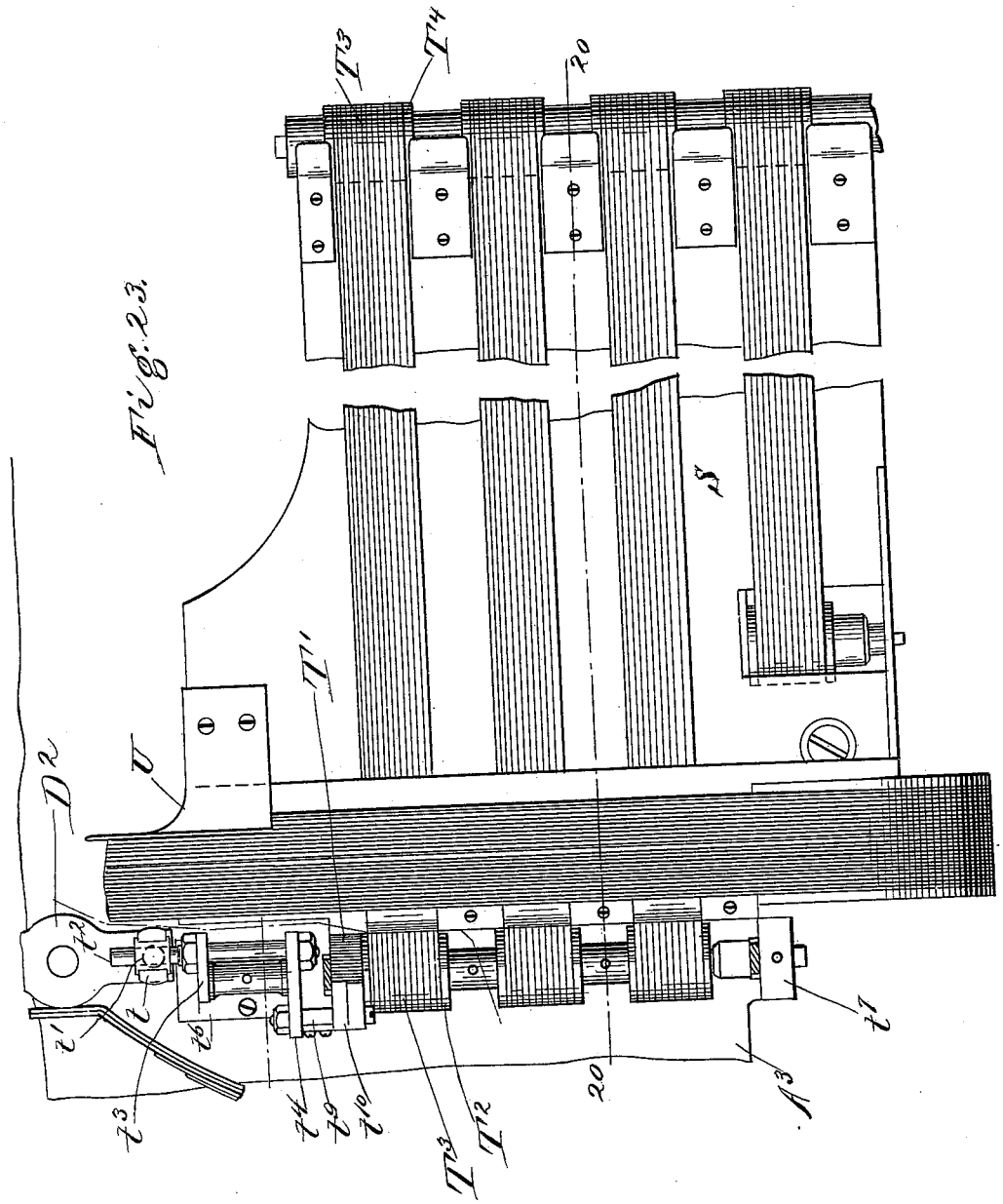

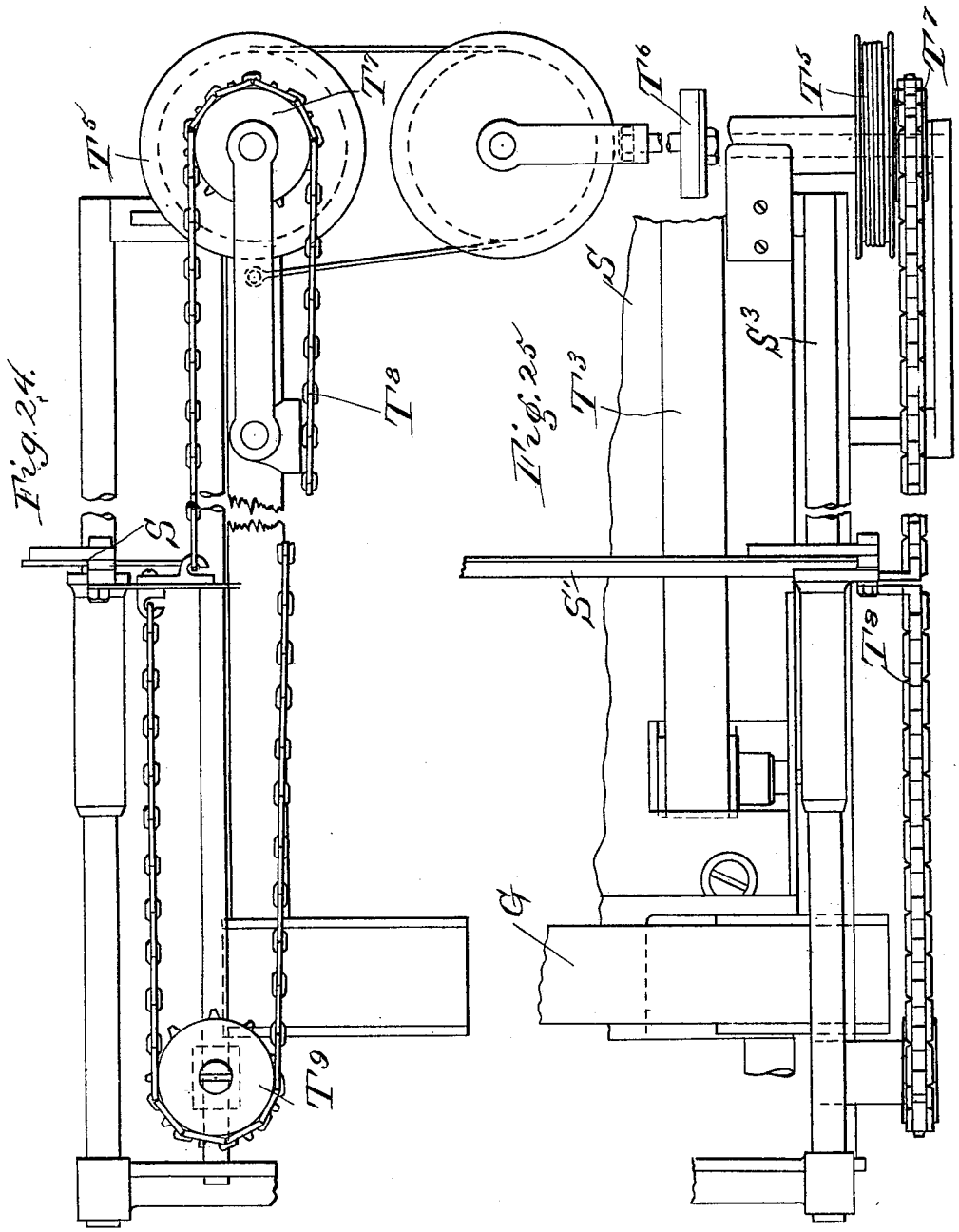

UNITED STATES PATENT OFFICE.

ERNST R. MALMBORG, OF CHICAGO, ILLINOIS, ASSIGNOR TO WARREN B. MARTINDALE, OF ROCHESTER, INDIANA.

POSTMARKING AND CANCELING MACHINE.

SPECIFICATION forming part of Letters Patent No. 615,031, dated November 29, 1898.

Application filed July 31, 1897. Serial No. 646,646. (No model.)

*To all whom it may concern:*

Be it known that I, ERNST R. MALMBORG, a citizen of the United States, residing at Chicago, county of Cook, State of Illinois, have invented a certain new and useful Improvement in Postmarking and Canceling Machines; and I declare the following to be a full, clear, and exact description of the same, such as will enable others skilled in the art to which it pertains to make and use the same, reference being had to the accompanying drawings, which form a part of this specification.

My invention relates to machines for postmarking mail-matter and canceling the postage-stamps, and is of the class in which the mail-pieces are taken from a miscellaneous pile and fed singly to the machine, the mechanism by a continuous series of mechanical operations postmarking the mail-pieces with the name of the post-office, the month and year, day of the month, hour and minute (a. m. or p. m.) that the letter passes through, and canceling the stamps, the marked mail pieces being delivered in an orderly stack for subsequent distribution.

The machine comprises a feed mechanism for carrying the mail-pieces to the marking mechanism, printing mechanism for postmarking them and canceling the stamps, including also time mechanism for automatically changing the time indicated by the postmark, and stacking mechanism for receiving the marked pieces and adding them to the stack.

With reference to the present state of the art my improvements consist in part in providing mechanism whereby a number of persons may feed a machine at one and the same time and providing means for causing each separate mail-piece to arrive at the marking-cylinder at the appropriate time, thus enabling the machine to be worked to its full capacity and avoiding the necessity of running it empty a portion of the time; also, in the novel construction of the time-printing mechanism contained in the marking-cylinder, the construction of the impression-roller and operation of the marking and impression cylinders in conjunction with a retarding-finger adapted to time the entrance of the mail-piece between said cylinders; also, in the novel construction and mechanism for receiving and stacking the said mail-pieces.

In the drawings, Figure 1 a top view of the complete machine, showing the general plan. Fig. 2 is a plan view of the right-hand end of the machine, as shown in Fig. 1. Fig. 3 is a plan view of one of the hoppers of the feed mechanism. Fig. 4 is a plan view of the left-hand end of the machine, as shown in Fig. 1. Fig. 5 is an elevation of a portion of a machine, looking in the direction of arrow 5, Fig. 2. Fig. 6 is an elevation looking in the direction of arrow 6, Fig. 2. Fig. 7 is an elevation looking in the direction of arrow 7, Fig. 2. Fig. 8 is a sectional view of parts in elevation on the line 8 8 of Fig. 4. Fig. 9 is a cross-section on the line 9 9 of Fig. 3. Fig. 10 is a section on the line 10 10 of Fig. 7. Fig. 11 is a sectional view on the line 11 11, Fig. 7. Fig. 12 is a sectional view on the line 12 12, Fig. 2. Fig. 13 is a detailed view of the ball-bearing, as shown in Fig. 12. Fig. 14 is a side elevation of the printing-head. Fig. 15 is a cross-section on the line 15 15 of Fig. 14. Fig. 16 is a vertical section on the line 16 16 of Fig. 14. Fig. 17 is a detail of the pawl for actuating the stamp mechanism. Fig. 18 is a plan view of the printing and impression cylinders. Fig. 19 is a side elevation with parts in section. Fig. 20 is a vertical section of the stacking mechanism in line 20 20 of Fig. 23. Fig. 21 is a side elevation of the pawl-and-ratchet mechanism of the stacker. Fig. 22 is a section on the line 22 22 of Fig. 21. Fig. 23 is a plan view of the receiving-table with a portion of the stacking mechanism removed. Fig. 24 is a side elevation of the receiving-table. Fig. 25 is a view from the top of mechanism shown in Fig. 24.

In carrying out the invention A, Figs. 5, 6, 7, and 12, represents a suitable standard extending from the floor or other support, and above this are plates $A'$ $A^2$ $A^3$, supported successively above each other by the bolts $A^4$. On a level with the plate $A^3$ is an extension $A^5$, Fig. 8, the outer end of this plate $A^5$ being supported by a suitable standard extending also to the floor or other support. The operative parts of the machine are carried by the plates A', A², A³, and A⁵, as hereinafter explained.

I will first describe the marking and canceling mechanism and afterward the mechanism for carrying the matter to the canceling mechanism.

Referring to Fig. 5, B represents a suitable driving-shaft journaled in bearing B', extending from the plate A'. On this shaft B is a beveled gear B², Figs. 7 and 11, which meshes with the beveled gear B³ on the upright shaft B⁴, Fig. 5, the latter being journaled in a bearing B⁵. (Shown by dotted lines, Fig. 5.) On this shaft B⁴ is a pinion B⁶, which meshes with the pinion B⁷ on the shaft B⁸, Fig. 10, the latter journaled in suitable bearings B⁹ in the plates A² A³. The upper end of the shaft B⁸ carries the printing-head C, in which is located the time-printing mechanism, which I will presently describe.

Referring now to Fig. 10, D is a shaft journaled in the plates A² A³, Fig. 6, and journaled thereon so as to have a horizontally-oscillating motion is an arm D', and journaled on the upper end of the shaft D is another horizontally-oscillating arm D², the two arms being connected together by a bolt D³, so that they will oscillate in unison. The opposite ends of these arms support the shaft D³, Figs. 6 and 10, and on the upper end of this shaft D³ is what I will term the "impression-roller" D⁴, Figs. 1, 2, and 6, as just explained. The arms D' D², which carry this impression roller D⁴, oscillate, and consequently the roller can yield toward and from the printing-roller C. A spring D⁵ tends to normally keep the impression-roller against the printing-roller C. On the shaft D and adapted to revolve thereon is a pinion D⁶, Fig. 10, which meshes with a pinion D⁷, keyed to the shaft D³, so that a revolution of the shaft B⁴ (which drives the printing-roller C) also revolves the shaft D³, and consequently the impression-roller D⁴.

I will now describe the construction of the printing-head and will refer particularly to Figs. 12, 13, 14, and 15.

On the standard A is a suitable clock E, of any desired construction, adapted at predetermined intervals to oscillate the arm e. By reference to Fig. 12 it will be seen that the shaft B⁸ is made hollow.

e' is a rod, Figs. 12 and 13, pivoted to the arm e of the clock and extending upward therefrom. On its upper end it is provided with a yoke e², with a plate e³ pivoted in said yoke by the pintles e⁴. e⁵ is another rod, provided with the collars e⁶ e⁷, located above and below the plate e³, separated therefrom by the balls e⁸.

It will be seen by the construction just described that the rod e' will impart its vertically-reciprocating motion to the rod e⁵, while at the same time the rod e⁵ can have a free rotary motion. Screw-threaded to the lower end of the shaft B⁸ and adapted to revolve therewith is a casing E², containing a bellows E³, the rod e⁵ being engaged to one end of said bellows. A tube or duct E⁴ leads from the interior of the bellows to the bore E⁵ of the shaft B⁸, suitable packing e⁹ being employed to make an air-tight joint. It will thus be seen that the oscillations of the arm e will be imparted to the bellows while the latter is continuously rotating, and the bellows will send air-impulses through the bore E⁵ up to the head C. In the head C is another bellows C', connected with the bore E⁵ by the tube C², a tight joint being insured by the packing c. On the end of the bellows C' is an arm C³, Fig. 15. Pivoted thereto is a lever C⁴, supported from the post C⁵ in the head C. Pivoted to the opposite end of the lever C⁴ is a link C⁶.

C⁷ is a shaft pivoted in the head C and carrying a series of ratchet-wheels C⁸ and accompanying gear wheels or pinions C⁹. On this shaft is also a yoke made up of the arms C¹⁰, Fig. 16, and connecting-strip C¹¹. In this yoke is pivoted the pawl-piece C¹², Fig. 17. (Also shown by dotted lines, Fig. 15.) The link C⁶ is pivoted to this yoke C¹⁰ C¹¹, so that the impulse imparted by the bellows C' is transmitted through the arm C³, lever C⁴, link C⁶, and yoke C¹⁰ C¹¹ to the pawl-piece C¹². The pawls c' on this pawl-piece engage the ratchet-wheels C⁸ and revolve them, a spring-impelled pawl C¹³ being provided for each ratchet-wheel to prevent backward movement.

C¹⁴ is another shaft pivoted in the head C, carrying a series of pinions C¹⁵, which mesh with the pinions C⁹, and C¹⁶ is another shaft pivoted in the head C, carrying a series of gears C¹⁷, which mesh with the gears C¹⁵. Engaged to each pinion C¹⁷ is its corresponding wheel bearing on the periphery the figure or other mark which it is desired to print.

It will thus be seen that through the mechanism just described the impulses imparted by the bellows C' will be transmitted to and will operate the printing-wheels C¹⁸, which project through the periphery of the head C.

It will be observed by reference to Fig. 16 that the shaft C¹⁶ is journaled in the plates C¹⁹ and the latter are held in place in the head by the screws C²⁰, Fig. 14. Engaged to these strips C¹⁹ are plates C²¹, bearing the marks that are more or less permanent—that is to say, the name of the month and the year—and outside of this is the plate C²² for holding the plates C²¹ in place, and this latter plate C²² also holds in place the circular plate C²³, on which may be placed any marks desired—such, for instance, as the name of the post-office where the stamping takes place. The plate C²² is held in place by the screws C²⁴. Thus it will be seen that by removing the plate C²² the plates carrying the name of the place, the month, and the year may be removed and changed and by loosening the screws C²⁰ the plates C¹⁹, carrying the printing-wheels, can be easily removed and cleaned without interfering with the balance of the mechanism in the head.

I wish at this point to call attention to the fact that the pawl-piece $C^{12}$ is located at substantially the center of the revolving head C, so that the centrifugal force due to the revolution of the head C has comparatively little effect on it; also, that the pawls $C^{13}$ have their bodies substantially on a radial line drawn from the center of the head through the pivotal point of the pawls, so that centrifugal force will have substantially no effect on these pawls; also, that the yoke $C^{10}$ $C^{11}$ has its body lying in the plane of the radial line drawn from the center of the head through the pivotal point of the yoke, so the centrifugal force will have substantially no action on this piece to move it, and that the movable end of the bellows lies in a plane corresponding to the radius of the head, so that the centrifugal force will have substantially no effect to move it; also, that the lever $C^4$ has arms of equal length, so that the lever is balanced and the revolution will not tend to move it.

I will now describe the construction of the impression-roller $D^4$. On the periphery of this roller is a covering of any suitable substance, preferably soft rubber $d$, to provide a yielding surface and also to properly engage and move the letters past the printing-head. At $d'$ the periphery is cut away, and adjacent to this opening $d'$ is a finger $d^2$ in circle with the periphery of said roller. This finger is engaged to the post $d^3$, extending upward from the arm $D^2$, so that when the roller $D^4$ yields this finger will yield also. The end $d^4$ of the finger, Fig. 18, is detached and held in position by the spring $d^7$ and normally pressed against the periphery of the disk W. Now, as will be seen by reference to Fig. 2, (shown by dotted lines,) the printing mechanism in the head C will reach the letter just after the jaw $d^6$ of the opening $d'$ reaches it, or, in other words, the rubber $d$ on the periphery of the head $D^4$ engages the letter just before the printing mechanism comes in contact with it. The result of this is that if a letter is fed to the rolls and reaches them before the printing mechanism has completed its revolution and is ready to print the letter is held back by the end $d^4$ of the finger $d^2$, and being opposite the opening in the roller $D^4$ there is nothing to move it along, and consequently it remains stationary until the jaw $d^6$ of the roller reaches it, picks it up, and carries it between the two rollers as it is printed. Thus no matter if there is a variation in the speed of the feed to the printing-rolls (and the variation is never more than the length of the opening $d'$) the stamp will always be placed on the letter the same distance from the end. Mounted above the printing-head and journaled on its casing at the center thereof is a disk W, having its periphery, Fig. 19, flanged, as at W', between which is placed a rubber band $W^2$, extending around the disk. The end $d^4$ of the finger $d^2$, resting against the rubber band $W^2$ and the disk W, is held normally stationary and the resistance offered to the progress of a mail-piece on the feed-belt is sufficient to stop and retain it until grasped by the jaw of the impression-roller $d^6$, when the mail-piece is carried between the printing and the impression rollers, the finger $d^2$ yielding with the impression-roller and the disk rotating so as to offer no resistance to the progress of the mail-piece.

I will now describe the inking mechanism. Located on the shaft B is a pulley F, Fig. 5, and journaled on the projecting arm F', extending from the plate $A^3$, is another pulley $F^2$, connected with the first by a belt $F^3$. Integral with or connected with the pulley $F^2$ is a disk $F^4$, Fig. 2. Pivoted to the plate $A^3$ is a lever $F^5$, and journaled therein are rollers $F^6$ $F^7$. The pivotal point of the lever $F^5$ is underneath the roller $F^6$. The bearing for the roller $F^6$ is slotted, as shown, and the disk $F^4$, being loose on its shaft, is held normally against the roller $F^6$ by the spring $F^8$. Normally the roller $F^7$ is kept in contact with the printing-head by the spring $F^9$, the pressure being regulated by the stop-pin $F^{10}$. Thus it will be seen that with ink spread upon the face of the disk $F^4$ (the disk traveling in the pan $F^{11}$, which contains ink) the roller $F^6$ will pick up the ink from the face of the disk $F^4$, distribute it on the roller $F^7$, and the latter will distribute it on the type. Of course as the disk $F^4$ travels through the pan $F^{11}$ both faces will be inked, and to prevent that on the face not in contact with the rollers $F^6$ from running down to the bearings I provide the grooved flange $F^{12}$. The roller $F^6$ and the disk $F^4$ both having movable bearings and held by spring contact will keep all the inking devices in contact with each other. If desired, the belt $F^3$ may be dispensed with and the inking devices revolved by the contact of the roller $F^7$ with the printing-roller.

I will now describe the mechanism for feeding the letters or other articles to be marked or canceled to the printing-head. Supported from the plate $A^5$, Fig. 8, by suitable standards $A^6$, is a table $A^8$, Fig. 8. This table $A^8$ forms what I will term the "feed-table"—that is to say, it is the table which supports the feeding mechanism and beside which the operators stand to feed the mail-pieces. Connected with and supported by the table $A^8$ is a series of feeding mechanisms $A^9$ $A^{10}$ $A^{11}$ $A^{12}$, Fig. 1, arranged alternately on each side of the table; but as they are duplicates of each other I will describe particularly but a single one. Journaled in bearings $A^{13}$ in the end of the plate $A^3$ is a pulley $A^{14}$, over which is passed the feed-belt G, Fig. 5. The opposite end of this feed-belt is supported from the pulley G', journaled in the end of the plate $A^5$. This is the main feed-belt of the machine and passes directly beneath the printing and the impression rollers C $D^4$, as shown in Figs. 1, 5, 6, and 18. On the shaft of the pulley G' is another pulley $G^2$.

$G^3$ is a belt passing over the pulley $G^2$ and over another pulley $G^4$ on the shaft B. Thus the motion of the shaft B is transmitted to the belt G. Supported from the plate $A^3$ and engaged thereto by the bolt H is a bracket H', carrying bearings $H^2 H^3$, Fig. 5. In these bearings is a shaft $H^4$, provided on its lower end with a gear $H^5$ and on its upper end with a band-pulley $H^6$.

$H^7$ is a band or belt passing around the pulley $H^6$ at one end and around the pulley $H^8$ at the opposite end, Fig. 4, the latter pulley being supported from a suitable bracket on the table $A^5$. On this belt at predetermined intervals are arranged what I will term "stop-plates" $H^9$. In order to prevent the belt $H^7$ from slipping on its pulleys $H^6 H^8$, I form on the inner face of the belt projections $h$, which enter recesses $h'$, Fig. 4, in the face of the pulley, so that in reality there is what might be termed a "sprocket engagement" between the pulleys and the belt. The belt $H^7$ is driven from the gear $H^5$, meshing with the gear $B^6$, the motion of the latter having been previously described. The arrangement of gearings is such that the belt G is driven at a faster speed than the belt $H^7$, and the stop-plates $H^9$ on the belt $H^7$ are so arranged that they will feed a letter to the printing-roll substantially at each revolution, the slight variation in the feed being compensated for, as hereinbefore explained, by the recess in the impression-roller. Now it will be seen when the letters are fed down to the belt G they strike the latter edgewise and are carried along in a trough, hereinafter explained, by the belt G. The belt G traveling at a faster rate than the belt $H^7$, a letter soon overtakes one of the stop-plates $H^9$ and is held back by the latter until ready for delivery to the printing-roller. Sustained from the plate $A^5$, Fig. 9, are two uprights J J', spaced sufficiently apart to provide a way or trough, grooves $j$ being provided in which the belt G may travel, a groove $j'$ being provided in which the belt $H^7$ may travel, and a groove $j^2$ provided in which a projection $h^2$ on the stop-plate $H^9$ may travel. Sustained also from the plate $A^5$ by suitable bolts or brackets are pieces $J^2 J^3 J^4 J^5$, forming a way or boxing through which the belt $H^7$ and its stop-plates may travel on its return.

I will now particularly describe one set of mechanism $A^9$ by which the letters are automatically fed down to the feeding-belts. Extending the entire length of the tables $A^5 A^8$ and suitably supported from bearings on the plate $A^5$ is a shaft K, Figs. 4 and 8, provided on its outer end with a gear K', which meshes with a gear $K^2$ on the opposite side of the belt G, the latter located on a shaft $K^3$, which is supported in suitable bearings on the plate $A^5$. Motion is given to the shaft K through the following mechanisms: On the main shaft B is a sprocket-wheel $K^4$, over which passes a sprocket-chain $K^5$, Fig. 7, to a sprocket-wheel $K^6$ on the shaft $K^7$, supported from a standard $K^8$ on the plate $A^3$. Connnecting the shaft $K^7$ with the shaft K is a short shaft $K^9$, Fig. 1, the shaft $K^9$ provided at each end with universal joints $K^{10} K^{11}$. Thus motion is imparted to the shafts K $K^3$. Supported from the table $A^8$ by suitable depending brackets M are two shafts, one on each side; but as they are duplicates of each other I have shown only that on the right-hand side of the machine when looking in the direction of arrow X, Fig. 1. This shaft is shown at M', Figs. 3, 4, 8, and 9, it being understood there is a corresponding shaft on the opposite side of the machine. This shaft M' is a rock-shaft provided on its end with a crank-arm $M^2$, connected by the pitman $M^3$ with the crank-pin $M^4$ on the gear $K^2$. The gear K', Fig. 4, is provided with a corresponding crank-pin $M^5$ and pitman $M^6$ for rocking the shaft on the opposite side of the machine corresponding with M'. Thus a revolution of the gear $K^2$ rocks the shaft M'. On the shaft $K^3$, Fig. 8, is a cam N, Fig. 8. Pivoted to a bracket N' on the plate $A^5$ is a link $N^2$, pivotally engaged to a rod $N^3$, the latter carrying on its end a plate $N^4$, adapted to bear upon the cam N. This plate $N^4$ may, if desired, be faced either with leather or other suitable material. The opposite end of the rod $N^3$ is pivoted by a slotted engagement (to provide adjustment) to the crank-arm $N^4$ on the shaft or sleeve $N^5$, which surrounds and is carried by the shaft M'. It will thus be seen that by means of the cam N the sleeve $N^5$ is given a rocking motion. On the shaft K is a corresponding cam $N^6$, which oscillates a rod $N^7$, corresponding with the rod $N^3$, to coöperate with the mechanism on the opposite side of the machine. A spring $N^8$ connects the pusher-plate $N^4$ with the plate $N^9$ to keep them constantly against their respective cams. On the sleeve $N^5$, Figs. 4 and 9, is a rock-arm $N^{10}$. Pivoted thereto, Fig. 9, is a rod $N^{11}$, pivoted to the rock-arm $N^{12}$ on the shaft $N^{13}$, the latter supported in the bearing $N^{14}$. Pivoted to the edge of the upright J by the rod O is a finger-plate O'. (Shown also in Fig. 3.) On the rock-shaft $N^{13}$ is an arm $N^{15}$, connected with the finger-plate by a link $N^{16}$, so that a rocking of the shaft $N^{13}$ through the rod $N^{11}$ and sleeve $N^5$ tilts the finger-plate up to the position shown by dotted lines, Fig. 9. Carried by the finger-plate O' is a rod $O^2$, and pivoted thereon is a small metal plate having fingers $O^3$, which project up between the fingers on the plate O'. Connecting this metal piece $O^3$ to some stationary point—say, for instance, the plate $A^5$—is a flexible band $O^4$, the result being that as the finger-piece O' is tilted up to the position shown by dotted lines the metal piece $O^3$ is drawn down, so that the fingers are below the surface of the frame O'. Keyed to the shaft M' is a plate P, having on its end an upwardly-turned flange of metal P'.

$P^2$ are strips forming the way down which the mail-pieces slide. The flange P' normally projects up into the path of the letter below the strips $P^2$. Extending along the table A⁸ is a strip P³, and pivoted to brackets P⁴ on the table A⁸ is a plate P⁵. Keyed to the shaft M' is an arm P⁶, connected with the plate P⁵ by a flexible strip P⁷. A spring P⁸, having one end engaged to the strips P², the other end engaged to a pin P⁹ on the plate P⁵, tends to normally keep the lower end of the plate P⁵ against the strip P³.

The operation of the mechanism is as follows: The operator places a letter on the plate P⁵. Through the gear K², (which is constantly revolving,) the rod M³, and arm M² the shaft M' is rocked, so that at predetermined intervals through the strip P⁷ the plate P⁵ will be pulled downward, as shown in Fig. 9, so that the letter can slide through onto the ways P². Sliding down it comes into contact and is stopped by the flange P'. A continued rocking of the shaft M' then throws the flange P' down below the surface of the way P², allowing the letter to slide onto the finger-plate O'; but it is stopped on this plate by the fingers O³. At a predetermined moment and when one of the stop-plates H⁹ is just beyond this set of feeding mechanism the cam N, as hereinbefore described, throws up the finger-piece O', draws down the fingers O³, and allows the letter to slide down into the trough formed by the uprights J J' just behind one of the stop-plates H⁹ and engaging the belt G. As before explained, the belt G travels at a faster rate of speed than the stop-plates H⁹, and the letter is soon carried up against the stop-plate and held back by it until ready for delivery to the printing-roll. Here, as before explained, the letter is marked and is then thrown out to the receiving mechanism, which I will now describe.

On the shaft B⁴, Fig. 10, is a disk Q, Fig. 2, carrying a crank-pin Q', to which is pivoted a pitman Q², the latter pivoted to a lever Q³. This lever is pivoted to a post Q⁴ on the adjustable arm Q⁵, the latter supported from the plate A³. Pivoted to the opposite end of the lever Q³ is a link Q⁶. Pivoted in bearings R on the plate A³ are two upright arms R' R², Fig. 6, connected together by the rod R³. The link Q⁶ is pivoted to this rod R³. Adjacent to the arms R' R² and pivoted also on the rod R³ are arms R⁶ R⁷. Pivoted to the upper ends of the arms R' R² are arms R⁴ R⁵. The arms R⁴ R⁵ and R⁶ R⁷ are connected together by the links R⁸. On the outer ends of the arms R⁴ R⁵ and engaging them together is the plate R⁹, and engaging the outer ends of the arms R⁶ R⁷ is the plate R¹⁰. The arms R⁴ R⁵, having a longer throw than the arms R⁶ R⁷, because they are pivoted to the upper ends of the levers R' R², will as the framework just described oscillates tend to push the upper edges of the letters farther over than the lower edges.

The operation of the mechanism just described is as follows: The lever Q³ is given an oscillating motion by the shaft B⁴. This reciprocates the link Q⁶ and oscillates the levers R' R². The letter as it leaves the printing-roll is carried by the belt G to a point opposite the plates R⁹ R¹⁰, when the reciprocation of the plate carries the letter laterally with its edges still up off from the belt onto a receiving-table S, the upper edge of the letter being tilted over by the plate R⁹ before explained. Behind the stack of letters just delivered is a stop-plate S', serving as a back plate for the stack. This plate S' is mounted on an arm S². This arm slides on the rod S³, the bearing being sufficiently elongated to maintain the plate S' in an upright position and yet will give before the stack of letters. The arm S² is pivoted to an arm S⁴ and slotted at its lower end to embrace the rod S⁵. This form of back plate is that usually employed in this class of machinery.

Referring to Fig. 18, U is a guide-plate with flanges at right angles to each other, one of which is secured to the table S and extends over the feed-belt G, the upright flange being adapted to cause the mail-pieces to be delivered in a direct line with said belt G.

I will now describe certain mechanism designed to assist the above-described stacking mechanism to overcome the friction caused by the weight of the mail-pieces on the receiving-table, and thus insure its operation at all times. On the end of the pivotal arm D², carrying the impression-roller D⁴, is a slotted support-piece $t$, Fig. 23, in which is a sliding bearing $t'$. Journaled in said bearing is the shaft $t^2$, Figs. 21, 22, and 23, of the crank-arms $t^3$ $t^4$. Said arms are made fast at the other end to the hollow shaft $t^5$, which forms a pivotal bearing on the shaft T, said shaft T having its bearings at one end in the support-piece $t^6$ and at the other end in the support $t^7$, Fig. 23. The support-pieces $t^6$ $t^7$ are made fast to the plate A³, Fig. 23. The arm $t^4$ has an extension carrying a crank-pin $t^9$, to which are pivoted the pawls $t^{10}$, adapted to engage the ratchet-wheel T', carried by the shaft T. Secured to the ratchet-wheel T' are pulleys T², also carried by the shaft T. The pulleys T² carry endless belts T³, which pass over and return under the receiving-table S. At the opposite end of said table are pulleys T⁴ for said belts. Mounted on the same shaft and rigidly connected on one side with the pulleys T⁴ is a ratcheted barrel T⁵, Fig. 25, of the usual construction. This drum is adapted to wind up a spring or weight, one side of which is rigidly mounted on the shaft, while the other side is loosely mounted in connection therewith and adapted to turn in one direction, but is prevented from turning in the other direction by a pawl-and-ratchet mechanism. The construction being old and well known is not here shown in detail. Carried by said barrel is the weight T⁶, Fig. 24, and rigidly attached to the loose side of the barrel T⁵ is the sprocket-wheel T⁷, adapted to turn freely in one direction when the weight T⁶ is being wound up and to turn in the other direction only with the pulleys T⁴. Carried by the sprocket-wheel T⁷ is a link belt T⁸, which is provided with a sprocket-wheel T⁹ at the other end of the receiving-table S. Attached to each end of the link belt T⁸ and forming an integral part thereof is the arm S⁴ of the stop-plate S'.

The operation of the last-described mechanism is as follows: The passage of a mail-piece between the printing and impression rollers causes the arm D² to be carried back a distance corresponding to the thickness of the mail-piece. The arm D² carries back with it the crank-arms $t^3$ $t^4$, causing the pawls $t^{10}$ to retract, and the ratchet T', being engaged by said pawls, is caused to rotate a corresponding distance when the arm D² returns to its normal position after the mail-piece has passed. The pulleys T² and belts T³ are also caused to rotate a distance corresponding to the thickness of the mail-piece added to the stack. The stack of mail-pieces resting on the belts T³ is moved accordingly. The stress of the weight T⁶ has a tendency to move said belts in the same direction, and thus overcome a portion of the friction caused by the weight on said belts. The sprocket-wheel T⁷, rotating with the pulleys T⁴, carries with it the link belt T⁸, and consequently also the stop-plate S', the weight T⁶ being wound up by moving back to its starting-point the stop-plate S'.

Recapitulating, it is of course obvious that the distance between stop-plates H⁹ corresponds with one revolution of the printing-head, and it will be also understood that the mechanism for feeding the letters to the stop-plates H⁹ will operate at a speed proportioned to the number of feed mechanisms provided—that is to say, in the present machine there are four sets of feed mechanisms A⁹ A¹⁰ A¹¹ A¹². The speed of each feed mechanism will therefore be one-quarter that of the printing mechanism. Now by regulating the speed of the feed mechanism so that it will keep one man busy to supply each set of feeding mechanism and by speeding the printing mechanism four times as fast the machine will have a capacity equal to substantially four times what it would have if but a single set of mechanism were provided.

Having fully described my invention, what I claim is—

1. In a postmarking and canceling machine, the combination with a rotary head, of a series of printing-wheels in said head, pawl-and-ratchet mechanism for revolving said wheels, and intermediate gearing between the pawl-and-ratchet mechanism and printing-wheels, said printing-wheels being mounted on a frame removable independently of the actuating mechanism, substantially as described.

2. In a postmarking and canceling machine, the combination with a rotary marking and canceling head, of time-printing mechanism mounted therein, consisting of a series of printing-wheels, actuating mechanism mounted independently of the printing-wheels, said printing-wheels being mounted on a frame removable independently of the actuating mechanism, substantially as described.

3. The combination with a revolving printing-head and printing-wheels located therein, of pawl-and-ratchet mechanism for actuating said wheels, said pawl mechanism being located at substantially the center of the revolving head, and intermediate gearing between the pawl mechanism and printing-wheels, said printing-wheels being mounted on a frame removable independently of the actuating mechanism, substantially as described.

4. The combination with a revolving printing-head and printing-wheels located therein, of pawl-and-ratchet mechanism for actuating said wheels, and pawls to prevent backward movement of said ratchet-wheels, said latter pawls having their body on substantially a radial line drawn from the center of the head through the pivotal point of the pawl, substantially as described.

5. The combination with a rotary printing-head and printing-wheels located therein, of pawl-and-ratchet mechanism for actuating said wheels, said pawl mechanism mounted substantially at the free end of a pivoted yoke and located substantially at the center of the revolving head, the body of the yoke lying substantially in the plane of a radial line drawn from the center of the head through the pivotal point of the yoke, substantially as described.

6. The combination with a rotary printing-head and printing-wheels located therein, of pawl-and-ratchet mechanism for revolving said wheels, intermediate gearing between the pawl-and-ratchet mechanism and printing-wheels, a bellows for actuating the pawl mechanism, and a pivoted lever having two arms of substantially the same length extending from the pivotal point, one of said arms being connected with the pawl mechanism and the other with the bellows, substantially as described.

7. In a postmarking and canceling machine, the combination with a rotary printing-head, of a continuously-rotating impression-roller yieldingly mounted adjacent thereto, said impression-roller having a portion of its periphery cut away forming a jaw adapted to act in conjunction with the printing-head in grasping the mail-piece and carrying same between said printing-head and impression-roller in position for canceling the stamp, and a feed mechanism having a series of traveling stops, one for each mail-piece, said traveling stops being timed with said impression-roller to deliver one mail-piece into the bite of said jaw at each revolution of the impression-roller, substantially as described.

8. The combination with feed mechanism adapted to carry the articles to the printing mechanism, of a series of traveling stops moving adjacent to the feed mechanism and timed with the printing mechanism, and rotary printing and impression cylinders, one of said cylinders having a portion of its periphery cut away forming a jaw adapted to grasp the article being fed and carry it between the two cylinders, substantially as described.

9. The combination of continuously-operating feed mechanism, with a series of traveling stops timed with the printing mechanisms, a printing-cylinder, and a segmental impression-cylinder adapted to time the entrance of an article between the two cylinders, and yielding stop mechanism movable by the article being fed and adapted to arrest said article on the feed mechanism until it is engaged by said cylinders, substantially as described.

10. The combination with continuously-operating feed mechanism, of a rotary printing-cylinder, a driven segmental rotary impression-cylinder, yieldingly mounted adjacent to the printing-cylinder, and a retarding-finger mounted to yield with the impression-cylinder, terminating adjacent to the point of nearest proximity between said printing and impression cylinders, substantially as described.

11. The combination with continuously-operating feed mechanism, of a rotary printing-cylinder, a driven segmental rotary impression-cylinder, a yielding frame in which the impression-cylinder is journaled, and a retarding-finger mounted on said frame terminating adjacent to the point of nearest proximity between the printing and impression cylinders, substantially as described.

12. The combination with continuously-operating feed mechanism, of a series of traveling stops timed with the printing mechanism, a rotary printing-cylinder, a driven rotary impression-cylinder having a portion of its periphery cut away forming a jaw adapted to act in conjunction with the printing-cylinder in grasping a mail-piece, said impression-cylinder mounted on a yielding frame and yieldingly actuated toward said printing-cylinder, and a yielding finger extending into the path of the mail-piece, and moved thereby only, and adapted to temporarily arrest its progress until it is grasped by said printing and impression cylinders, substantially as described.

13. The combination with feed mechanism of a rotary printing-cylinder, a continuously-driven segmental rotary impression-cylinder, one of said cylinders yieldingly actuated toward the other, and stop mechanism in circle with the periphery of the impression-cylinder mounted above its plane substantially in line with its circumference, on the side from which articles are fed to said cylinders.

14. The combination of feed mechanism with a series of traveling stops timed with the printing mechanism, rotary printing and impression cylinders, one of said cylinders yieldingly actuated toward the other and a finger mounted to yield with the yielding cylinder and terminating adjacent to the other cylinder, the end of the finger being provided with a spring-seated tip, substantially as described.

15. The combination with rotary printing and impression cylinders one of said cylinders yieldingly actuated toward the other, a feed-belt traveling beneath said cylinders, a disk mounted above the printing-cylinder adapted to rotate independently of said cylinder, and a retarding-finger coöperating with said disk to form stop mechanism, substantially as and for the purpose herein described.

16. The combination with continuously-operating feed mechanism, of a rotary printing-cylinder, a disk mounted above said cylinder adapted to turn independently thereof, a segmental impression-cylinder yieldingly mounted adjacent to said printing-cylinder and actuated toward the same, and a retarding-finger mounted to yield with the impression-cylinder terminating normally in contact with said disk, substantially as described.

17. The combination with a revolving printing-head and the time-printing mechanism located therein, of stationary time mechanism, a rod for transmitting time impulses from said time mechanism to the time-printing mechanism, and a coupling in said rod one portion of which is adapted to revolve while the other portion is not adapted to revolve, substantially as described.

18. The combination with printing mechanism, of a feed mechanism adapted to carry the articles to the printing mechanism, and a series of traveling stops moving adjacent to the feed mechanism at a slower speed and adapted to retard the speed of the articles being fed as they are being carried along by the feed mechanism, substantially as described.

19. A feeding mechanism consisting of a continuously-moving belt adapted to engage the articles to be fed, and an adjacent belt moving at a slower speed than the first belt and stop-plates on the slower belt adapted to retard the speed of the articles being fed.

20. In a postmarking and canceling machine, the combination with the printing mechanism of a feed-belt and trough for carrying the matter to be fed to the printing-head, and a belt above the said feed-belt having stop-pieces which travel in the trough, said pieces moving at a slower speed than the feed-belt and adapted to retard the speed of the articles being fed and to deliver them to the printing mechanism at the desired time, substantially as described.

21. In a postmarking and canceling machine feed mechanism, the combination with an inclined way down which the mail-pieces are fed, of additional feed mechanism on which the mail-pieces are deposited, and stop mechanism for holding the mail-piece on the inclined way until it is desired to release the same, substantially as described.

22. In a postmarking and canceling machine feed mechanism, the combination of an inclined way down which the mail-pieces slide, a continuously-operating feed mechanism onto which the mail-piece is thrown, stop mechanism for holding the mail-piece on the inclined way until it is desired to release it, and an oscillating frame adapted to receive the mail-piece after it is released by the stop mechanism and deposit it onto the feed mechanism, substantially as described.

23. An automatic feed for a postmarking and canceling machine consisting of an inclined way, stop mechanism thereon for detaining the mail-pieces until it is desired to release them, an oscillating frame for receiving said mail-pieces and depositing them onto the continuous feed mechanism and additional stop mechanism below the oscillating frame, substantially as described.

24. An automatic feed for a postmarking and canceling machine, consisting of the inclined way $P^2$, the stop mechanism $P'$, the plate $P^5$ operating conjointly with said stop mechanism $P'$, the oscillating frame $O'$ and stop mechanism $O^3$, substantially as described.

25. In a postmarking and canceling machine, the combination of rotary printing and impression cylinders, an endless belt for carrying the mail-pieces to said cylinders, and a series of automatic mechanism for feeding said mail-pieces to the belt, substantially as described.

26. In a machine of the class described, the combination with a rotary printing-head, an endless belt for carrying mail-pieces to the printing-head, another belt adjacent to the first, traveling at a slower speed than the first, and provided with stop-plates and a series of automatic feed mechanism, each feeding mechanism adapted to deliver a piece of mail just back of one of the stop-plates, substantially as described.

27. In a postmarking and canceling machine, the combination with feed mechanism and printing mechanism, one member of which is yielding, of a table adapted to receive mail-pieces after they have been marked, a carrier for conveying the mail-pieces along said table as the stack increases, clutch mechanism between said carrier and the yielding member of said printing mechanism, and a reciprocating pusher-plate adapted to push the mail-piece out of the line of delivery and upon said carrier, substantially as described.

28. The combination with the printing mechanism of a table beyond said printing mechanism adapted to receive the mail-pieces after they are marked and two reciprocating pusher-plates adjacent thereto for pushing the mail-pieces out of the line of delivery and upon said table, and mechanism for giving the upper plate a greater throw than the lower one.

29. The combination with the feed-belt and a receiving-table of two reciprocating plates mounted on oscillating levers, the upper plate mounted to the upper end of said levers, and the lower plate mounted on the levers below the upper plate whereby the upper plate will have the greater throw, substantially as described.

30. The combination with the printing and impression cylinders, at least one of which is yielding, and a belt for receiving the mail-piece after it has been printed, of clutch mechanism between said belt and the yielding cylinder whereby the passage of the mail-piece past the yielding cylinder moves said belt, substantially as described.

31. The combination with the printing and impression cylinders, one of them yielding with respect to the other and a delivery-belt, of clutch mechanism between the belt and the yielding member and connected directly to said yielding member, of the printing mechanism, whereby a movement of said yielding member will move the belt a corresponding distance, substantially as described.

32. The combination with the marking and impression rollers, one of said rollers journaled in fixed bearings and the other in a movable frame, of pawl-and-ratchet mechanism connected directly to said frame and actuated by the movement thereof, substantially as described.

33. The combination with the marking and impression rollers, one of said rollers journaled in fixed bearings and the other in a movable frame, of pawl-and-ratchet mechanism actuated by the movement of said frame, and a pulley actuated by said pawl-and-ratchet mechanism, substantially as described.

34. The combination with the marking and impression rollers, one of said rollers journaled in fixed bearings and the other in a movable frame, of pawl-and-ratchet mechanism actuated by the movement of said frame, a pulley rotated by said pawl-and-ratchet mechanism, and an endless belt rotated by said pulley, substantially as described.

35. In a machine of the class described, the combination with the feed-belt and marking and impression rollers, one of said rollers being yielding, of stacking mechanism consisting of a receiving-table, a reciprocating pusher-plate adjacent thereto, pawl-and-ratchet mechanism connected to said yielding roller and actuated by the passage of a mail-piece between said rollers, and a series of pulleys and endless belts actuated by said pawl-and-ratchet mechanism, substantially as described.

36. The combination with a receiving-table, a reciprocating pusher-plate, pawl-and-ratchet mechanism adapted to rotate a series of carrying-belts, of means for applying additional power to assist said pawl-and-ratchet mechanism to overcome the friction on said belts, substantially as described.

37. In a postmarking and canceling machine, the combination with the feed-belt and marking and impression rollers, of pawl-and-ratchet mechanism adapted to be actuated by the passage of a mail-piece between said rollers, a pulley actuated by said pawl-andratchet mechanism, a belt carried by said pulley, a second pulley for said belt and a ratcheted barrel on the same shaft with said second pulley adapted to turn with said pulley in one direction and to turn independently thereof in the other direction, substantially as described.

38. The combination with the feed-belt and marking and impression rollers, of a receiving-table, a reciprocating pusher-plate, pawl-and-ratchet mechanism adapted to be actuated by the passage of a mail-piece between said rollers, a pulley actuated by said pawl-and-ratchet mechanism, a belt carried by said pulley, a second pulley for said belt, a ratcheted barrel on the same shaft with said second pulley, a weight carried by said barrel, and a sprocket-wheel rigidly connected with the loose side of said barrel, substantially as described.

39. The combination with the feed mechanism and marking and impression heads, of a receiving-table, a reciprocating pusher-plate, pawl-and-ratchet mechanism adapted to be actuated by the passage of a mail-piece between said marking and impression heads, a pulley actuated by said pawl-and-ratchet mechanism, a belt carried by said pulley, a second pulley for said belt, a ratcheted barrel mounted on the same shaft with said second pulley, a sprocket-wheel attached to said barrel, and a chain carried by said sprocket-wheel, substantially as described.

40. The combination with the feed mechanism and marking and impression rollers, of pawl-and-ratchet mechanism adapted to be actuated by the passage of a mail-piece between said rollers, a pulley actuated by said pawl-and-ratchet mechanism, a belt actuated by said pulley, a second pulley actuated by said belt, a ratcheted barrel mounted on the same shaft with said second pulley, additional means applied to said barrel for revolving it, a sprocket-wheel connected with said barrel, a chain carried by said sprocket-wheel, a second sprocket-wheel for said chain, and a stop-plate connected with said chain, substantially as described.

In testimony whereof I sign this specification in the presence of two witnesses.

ERNST R. MALMBORG.

Witnesses:
DE WITT W. CHAMBERLIN,
WALTER H. CHAMBERLIN.